(12) United States Patent
Meggiolan

(10) Patent No.: US 8,033,937 B2
(45) Date of Patent: Oct. 11, 2011

(54) ACTUATOR DEVICE AND RELATIVE NUT FOR A BICYCLE GEARSHIFT, WITH AN ELASTICALLY YIELDING MEMBER

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 933 days.

(21) Appl. No.: 10/911,195

(22) Filed: Aug. 4, 2004

(65) Prior Publication Data
US 2005/0266945 A1    Dec. 1, 2005

(30) Foreign Application Priority Data
Aug. 5, 2003 (EP) .................................... 03425534

(51) Int. Cl.
*F16H 9/00* (2006.01)
*B60K 17/04* (2006.01)

(52) U.S. Cl. ................ 474/70; 474/80; 474/82; 474/78; 74/473.12

(58) Field of Classification Search ............ 474/70, 474/80, 82, 78; 74/473.12
See application file for complete search history.

(56) References Cited

U.S. PATENT DOCUMENTS

| | | | |
|---|---|---|---|
| 1,033,187 A | 7/1912 | Metzger | |
| 2,630,303 A | 3/1953 | Krucker | |
| 2,649,300 A | 8/1953 | Launder | |
| 3,181,383 A * | 5/1965 | Juy | 474/82 |
| 3,455,580 A | 7/1969 | Howard | |
| 3,690,194 A * | 9/1972 | Edwards | 74/427 |
| 4,131,031 A * | 12/1978 | Erikson et al. | 74/441 |
| 4,241,617 A * | 12/1980 | Nagano et al. | 474/82 |
| 4,459,867 A | 7/1984 | Jones | |
| 4,838,837 A * | 6/1989 | Testa | 474/80 |
| 5,048,786 A * | 9/1991 | Tanaka et al. | 248/429 |
| 5,452,910 A * | 9/1995 | Harris | 280/284 |
| 5,470,277 A * | 11/1995 | Romano | 474/70 |
| 5,480,356 A * | 1/1996 | Campagnolo | 474/70 |
| 5,482,413 A | 1/1996 | Argaud | |
| 5,732,596 A * | 3/1998 | Erikson et al. | 74/441 |
| 5,761,963 A | 6/1998 | Hartwig | |
| 6,119,541 A * | 9/2000 | Robinson | 74/441 |
| 6,350,212 B1 * | 2/2002 | Campagnolo | 474/80 |
| 6,394,921 B1 * | 5/2002 | Fukuda | 474/80 |
| 6,497,007 B2 | 12/2002 | Newman et al. | |
| 6,679,797 B2 | 1/2004 | Valle | |
| 6,925,686 B2 | 8/2005 | Heathcock et al. | |
| 7,021,817 B2 | 4/2006 | Huang et al. | |
| 7,153,257 B2 | 12/2006 | Schneider et al. | |
| 2004/0014541 A1 | 1/2004 | Dal Pra | |
| 2005/0192140 A1 | 9/2005 | Meggiolan | |
| 2005/0266945 A1 | 12/2005 | Meggiolan | |

FOREIGN PATENT DOCUMENTS

| | | |
|---|---|---|
| DE | 035 02 774 A1 | 10/1986 |
| DE | 3502774 A1 | 10/1986 |
| DE | 042 31 761 A | 3/1994 |
| EP | 0 936 380 A1 | 8/1999 |
| EP | 1 010 612 A1 | 6/2000 |

(Continued)

*Primary Examiner* — Bradley King
*Assistant Examiner* — Mahbubur Rashid

(57) ABSTRACT

An actuator device for a bicycle gearshift is provided. The actuator comprises an actuation mechanism, driven by a drive member and in turn to drives a derailleur of the gearshift. The mechanism comprising a member which—in the case of a knock to the mechanism—is subjected to a stress; the member is capable of elastically yielding when subjected to a stress above a predetermined stress threshold.

17 Claims, 8 Drawing Sheets

FOREIGN PATENT DOCUMENTS

| | | |
|---|---|---|
| EP | 1 103 456 A2 | 5/2001 |
| EP | 1 357 023 A1 | 10/2003 |
| FR | 2 651 474 A | 3/1991 |
| JP | 07251784 | 10/1995 |
| JP | 2001200930 | 7/2001 |
| JP | 2002087371 | 3/2002 |
| JP | 2003045590 | 2/2003 |
| JP | 2004001728 | 1/2004 |

* cited by examiner

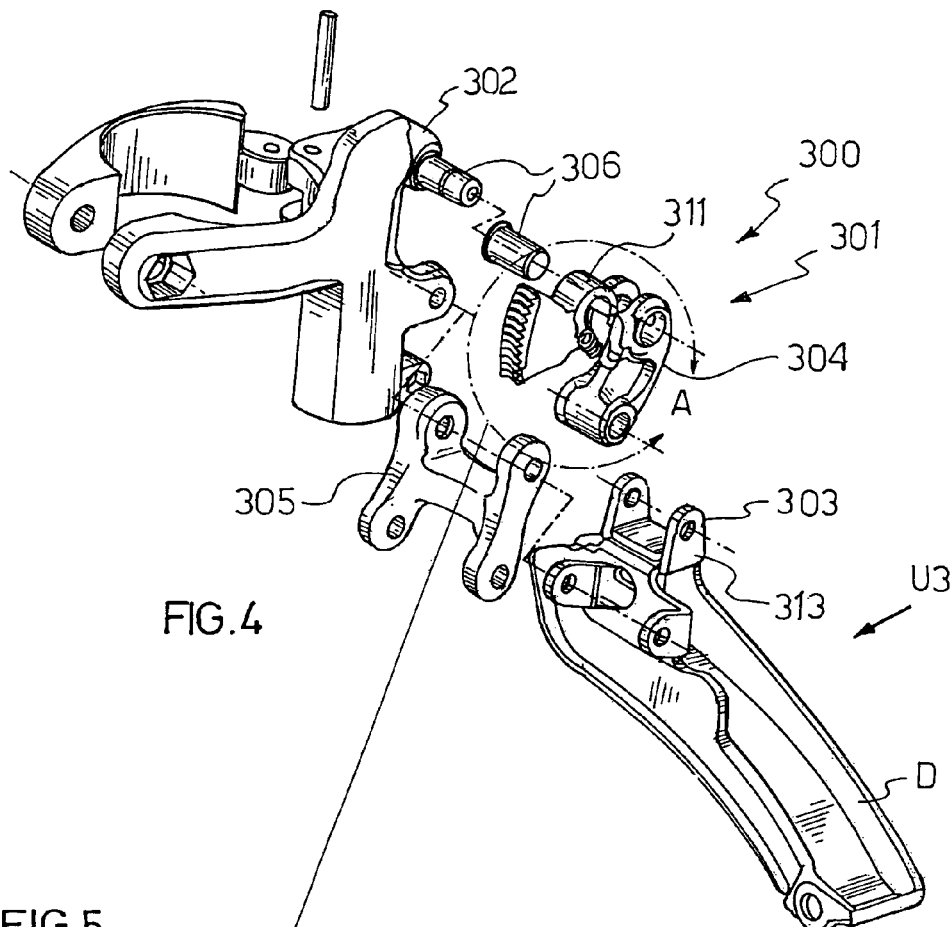
FIG.4
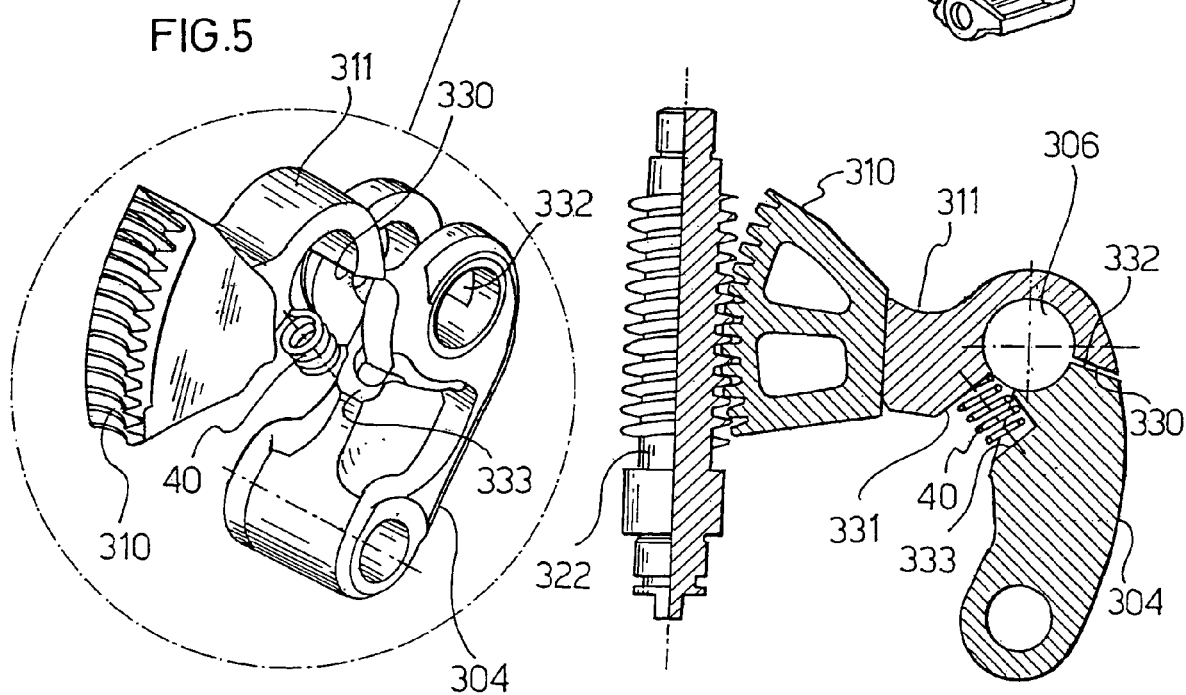
FIG.5
FIG.6

ACTUATOR DEVICE AND RELATIVE NUT FOR A BICYCLE GEARSHIFT, WITH AN ELASTICALLY YIELDING MEMBER

FIELD OF THE INVENTION

The present invention refers to both an actuator device for a bicycle gearshift, comprising an actuation mechanism, to be driven by a drive member and in turn to drive a derailleur of the gearshift, and to a nut for such a device.

BACKGROUND

In the context of this patent description and the following claims, the gearshift can be either a rear one, which shifts a chain between different sprockets associated with a rear wheel of the bicycle, or a front one, which shifts the chain between different crowns associated with pedal cranks.

Recently bicycle gearshifts with motorized actuation have become widespread, wherein the displacement of the derailleur that deviates the chain takes place under the action of a drive member that is electronically operated. In developing such gearshifts, a great deal of attention has been given to the quality of actuation, meaning the ability of the gearshift to perform gear-shifting quickly and precisely at least to the same degree as a conventional manually actuated gearshift. Inventors have, however, realized that in normal use the performance of a motorized actuating gearshift is often compromised by even small damage. This is often the consequence of unseen knocks received by the gearshift itself.

Indeed, with gearshifts of this type, the actuation mechanism is a system that is mechanically coupled to the drive member. In the case of knocks, due for example to the bicycle falling or even due only to loading, unloading and transportation on a vehicle, the gearshift can undergo various amounts of damage. A particularly serious knock can, in the most serious of cases, cause the breaking of some members of the gearshift. Less serious knocks can, on the other hand, cause small deformations or even just small mutual displacements of the members of the gearshift, often not immediately noticeable at a glance, but still such as to compromise the precision and therefore the proper operation of the gearshift. Such deformations or displacements can, in other cases, be determined during gear-shifting by temporary locking of the mechanism with respect to the drive member, as sometimes occurs following mechanical interference between the chain and sprockets.

The problem to be solved by the present invention is that of protecting the actuation mechanism of a motorized actuation gearshift in a simple and efficient manner.

SUMMARY

Therefore, the present invention relates to, in a first aspect, an actuator device for a bicycle gearshift. The actuator comprises an actuating mechanism that is driven by a drive member and in turn drives a derailleur, wherein the mechanism comprises at least one member that is elastically yielding when subjected to a stress above a predetermined threshold According to a second aspect, the present invention relates to a nut for an actuator device for a bicycle gearshift. The nut comprises an internally hollow tubular body, two abutment surfaces in an axial direction formed at opposite ends of the tubular body; two opposite pin portions integral and perpendicularly to the tubular body.

BRIEF DESCRIPTION OF THE DRAWINGS

Further characteristics and advantages of an actuator device for a bicycle gearshift and of a nut according to the invention shall become clearer from the following description of some preferred embodiments. Such embodiments are provided as an example and are shown in the attached drawings, wherein:

FIG. 4 is an exploded perspective view of a third embodiment of the invention;

FIG. 5 is an enlarged view of the detail A of FIG. 4;

FIG. 6 is a section view of a part of the device of FIGS. 4 and 5;

DETAILED DESCRIPTION OF THE PREFERRED EMBODIMENTS

Figure 1:
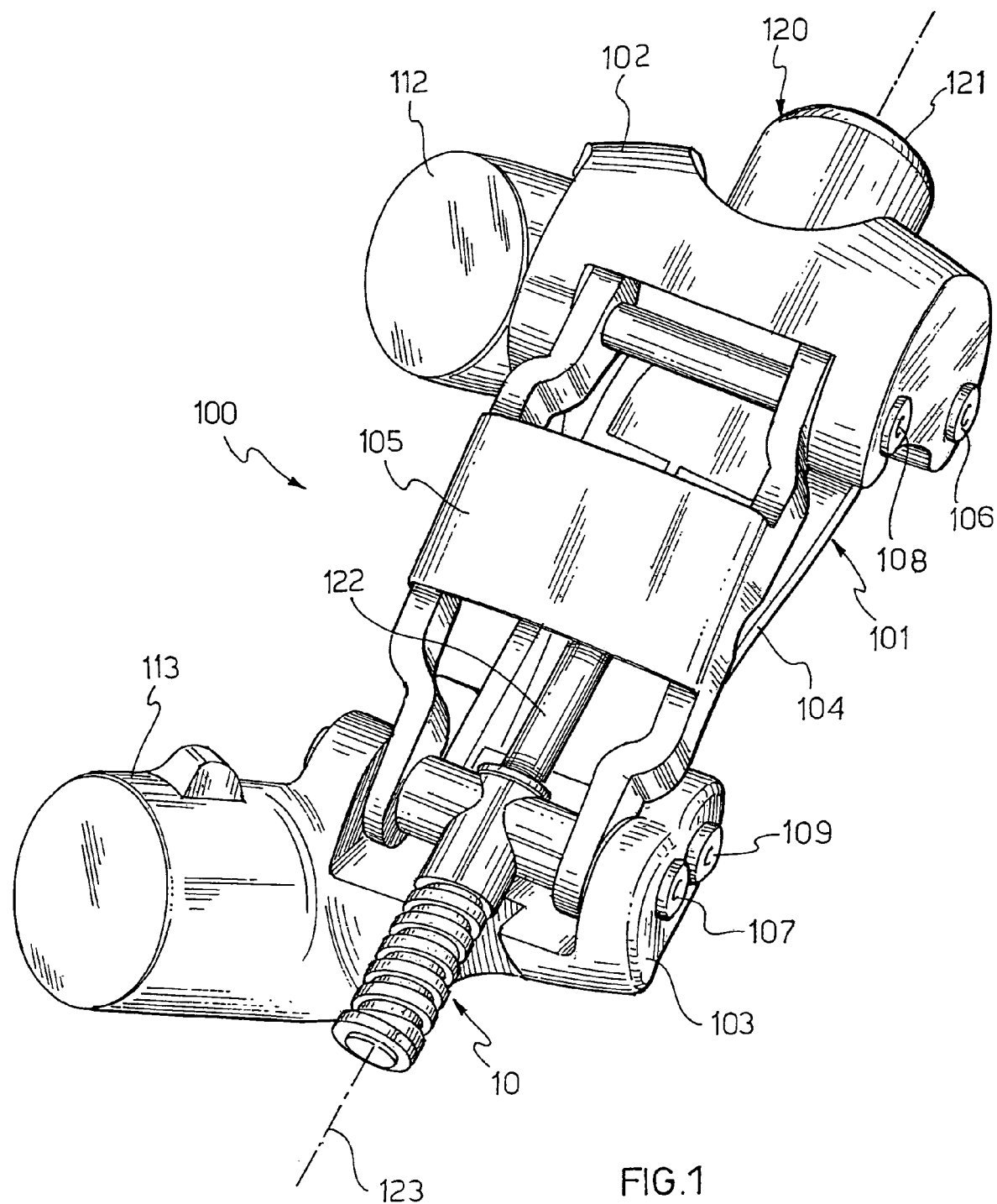
FIG. 1 is a perspective view of an actuator device in accordance with a first embodiment of the invention.
Figure 2:
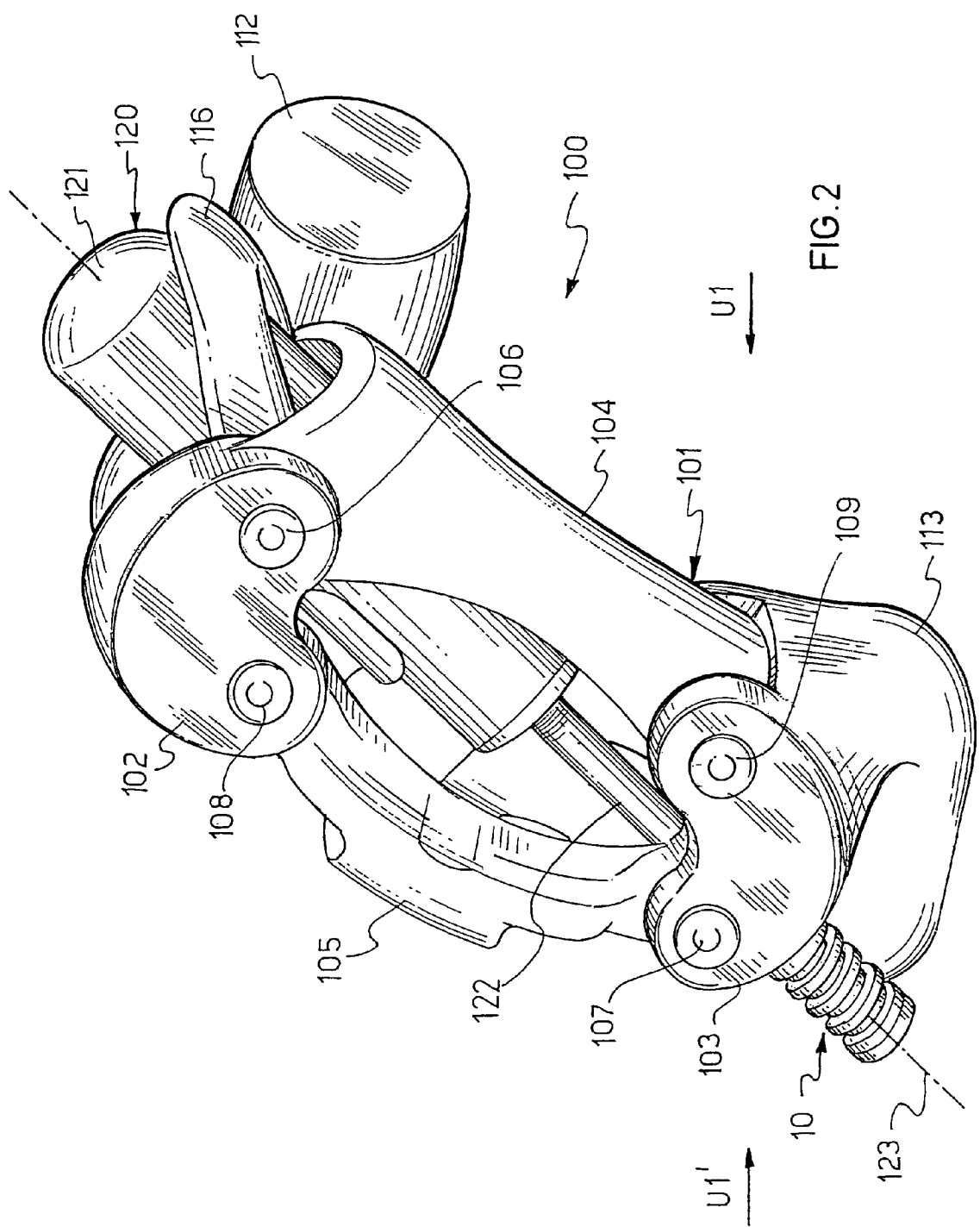
FIG. 2 is a different perspective view of the device of FIG. 1.

With particular reference to FIGS. 1 and 2, an actuator device for a bicycle gearshift, particularly a rear gearshift, according to a first embodiment of the invention, is indicated by 100.

The device 100 comprises an actuation mechanism 101 in the shape of an articulated quadrilateral, more precisely an articulated parallelogram, intended to be driven by a drive member 120 and in turn to drive a normal derailleur (not shown) of a rear gearshift of a bicycle. In alternative embodiments (not shown) the articulated quadrilateral can be a trapezoid instead of a parallelogram.

The mechanism 101 comprises four connecting rods articulated together by four pin elements. The connecting rods comprise a first connecting rod 102 associated with a support 112 for fastening onto a bicycle frame, a second connecting rod 103 opposite the first connecting rod 102 and associated with a support 113 for fastening the derailleur, a third connecting rod 104 and a fourth connecting rod 105. The pin elements comprise a first pin element 106 (between the first and the third connecting rod 102 and 104), a second pin element 107 opposite the first (between the second and the fourth connecting rod 103 and 105), a third pin element 108 (between the first and fourth connecting rod 102 and 105) and a fourth pin element 109 opposite the third (between the second and third connecting rod 103 and 104).

A support 116 for the drive member 120 is associated with the first pin element 106. It should be noted that the term "associated" referring to a member in relation to a pin element or to a connecting rod is meant, here and in the following, that the member in question is mechanically connected to the pin element or to the connecting rod, or is formed integrally with it, or else that such a member is shaped in such a way as to be able to perform the functions of the pin element or of the connecting rod. The drive member 120 comprises an electric motor 121 (supplied with power and controlled by means of cables and control members that are not shown in the Figures) equipped with a threaded drive shaft 122, extending along a driving axle 123 and rotated by the motor 121. In the example shown in FIG. 2, the support 116 is substantially cradleshaped, so as to be able to house the motor 121 with the driving axle 123 substantially perpendicular to the axis of the pin 106.

The drive member 120 is coupled with the mechanism 101 by means of a shock absorber or nut 10, in screwing engagement with the threaded drive shaft 122 and associated with the second pin element 107. Through the nut 10 and the support 116, the drive member 120 is able to move the mechanism 101, lengthening or shortening the diagonal distance between the pin elements 106 and 107. In particular, given that the device 100 is used in a rear gearshift of a bicycle, a lengthening of such a diagonal shall be used to perform upwards gear-shifting (towards an inner sprocket of the sprocket, with a larger diameter), whereas, conversely, a shortening of the diagonal shall be used for downwards gear-shifting (towards an outer sprocket of the sprocket, with a smaller diameter).

Figure 7:
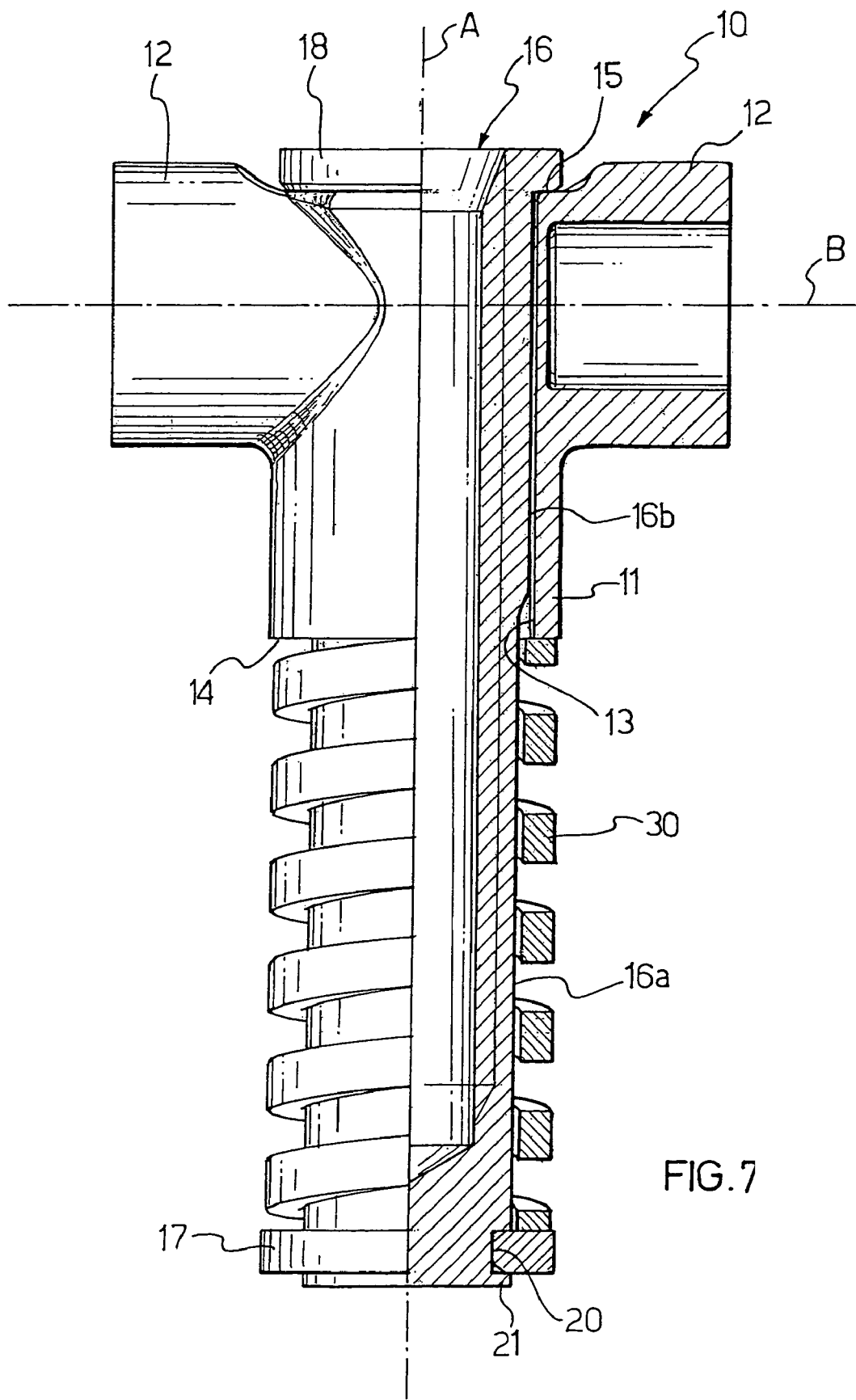
FIG. 7 is a section view of a nut in accordance with the invention, used in the devices of FIGS. 1 to 3.
Figure 8:
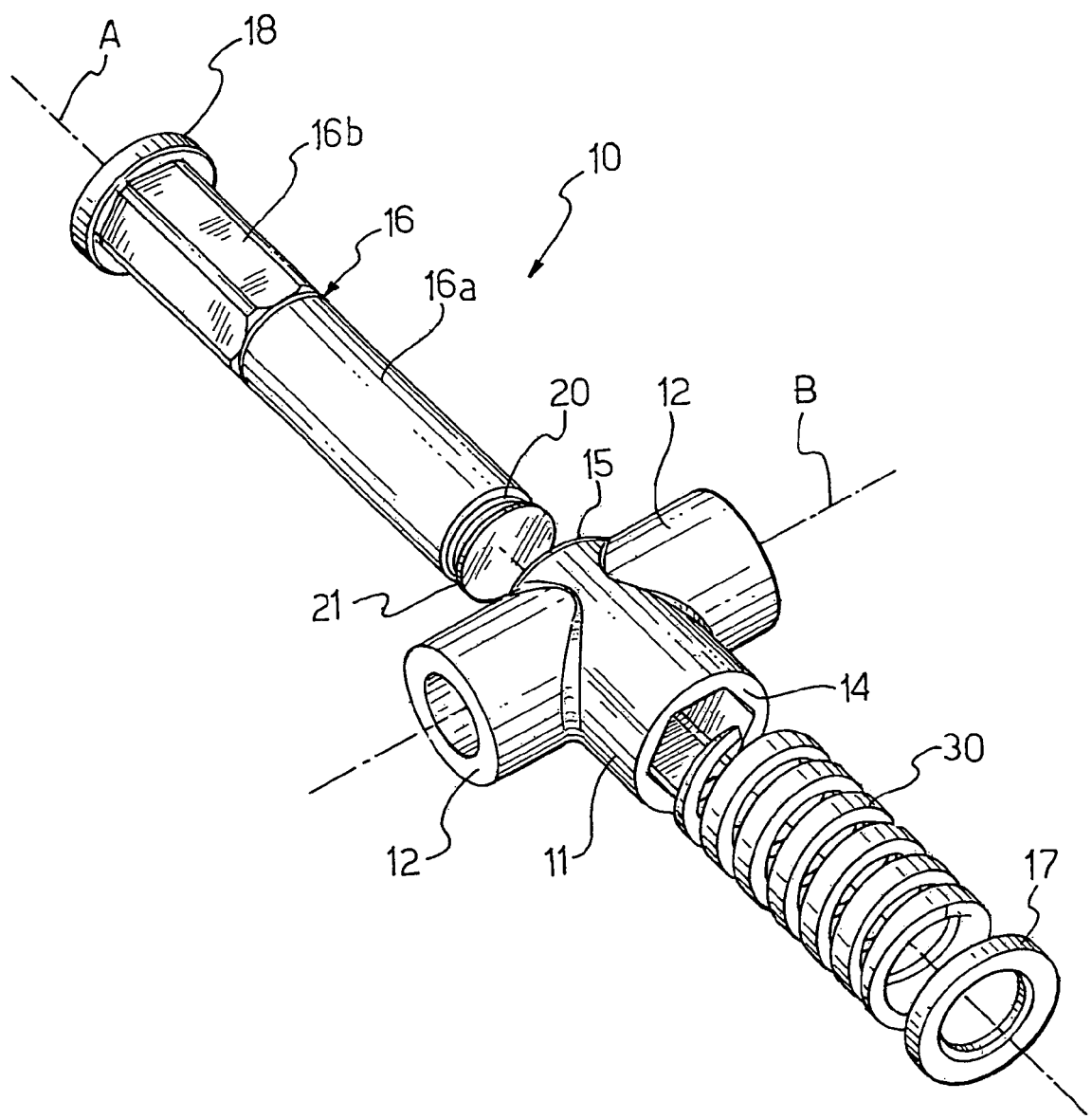
FIG. 8 is an exploded perspective view of the nut of FIG. 7.

In accordance with the invention, the nut 10 (as shown in FIGS. 7 and 8) comprises a tubular body 11 extending along an axis A and integral with two identical pin receiving portions 12, which are aligned and opposite each other, extending along an axis B substantially perpendicular to the axis A. The pin receiving portions 12 are integral with the tubular body 11 or preferably are formed integrally with it. The tubular body 11 is equipped with an inner through-recess 13 with a polygonal section, extending along the axis A between two annular abutment surfaces, a first abutment surface 14 and a second abutment surface 15, formed at opposite ends of the tubular body 11.

The nut 10 also comprises a tubular sleeve 16, threaded internally with an inner threading matching the outer threading of the drive shaft 122, so as to allow the engagement between the drive shaft 122 and the nut 10. The sleeve 16 has a portion 16a with an externally circular section and a portion 16b with an externally polygonal section, matching the section of the inner recess 13, so as to allow the sleeve 16 inserted in the recess 13 of the tubular body 11 to be able to slide along the axis A but not to be able to rotate about such an axis. The sleeve 16 is equipped, at its opposite ends, with two protruding abutment collars, a first collar 17 and a second collar 18.

The first collar 17 is in the form of an elastic annular washer, mounted on the circular portion 16a of the sleeve 16, in a respective circumferential throat 20 formed on the outer surface of the sleeve 16. The second collar 18 is in the form of a protruding circular head of the portion 16b of the sleeve 16. Alternatively, the washer which forms the collar 17 can simply be inserted onto the circular portion 16a of the sleeve 16 and can be held there by an elastic ring (Seger ring), removably housed in a respective throat formed on the sleeve 16.

The nut 10 also comprises a spring 30, inserted on the sleeve 16. In conditions with the nut 10 mounted (FIG. 7), the sleeve 16 is inserted in the tubular body 11, with the second collar 18 facing the second abutment surface 15 and with the spring 30 compressed between the first abutment collar 17 and the first abutment surface 14.

The spring 30 shown as an example is a metal helical spring; instead of this, a tubular elastomeric spring or any other spring able to perform the same action in the nut 10 could be used.

Preferably, said member that is capable of elastically yielding comprises a preloaded spring. The term spring means an element that is able to provide an elastic reaction of whatever type: by traction, compression, torsion, bending; it can, for example, be a metal helical spring, a metal torsion spring, a metal Belleville spring, a flexible foil, an air spring, a variously shaped elastomeric spring, and the like. The adjective preloaded means that the spring is used in a pre-stressed state, for example pre-compressed or pre-stretched, in such a way that at rest it applies an elastic stress different to zero, equal to the desired threshold stress. The spring is thus able to yield elastically only if the stress applied onto it is greater than the predetermined stress threshold value. In the case of a knock, for example, if the stress applied is lower, like in the case of normal use of the gearshift, the spring has no yield.

Choice, sizing and compression of the spring 30 as well as assembling of the nut 10 are carried out depending upon the protective action that the nut 10 must provide inside the actuator device in which it is mounted.

In the device 100, it is necessary to avoid a knock in the direction U1 (FIG. 2) against the device 100 itself that can cause damage. This means that the elastic yield of the nut 10 must allow a lengthening of the diagonal between the pin elements 106 and 107 also with the motor 121 off (or at least a lengthening different to what the motor 121 would apply). Consequently, the nut 10 is mounted by inserting the threaded drive shaft 122 into the sleeve 16 from the side of the second abutment collar 18. A knock will compress the spring 30, making the sleeve 16 slide in the tubular body 11.

Figure 9:
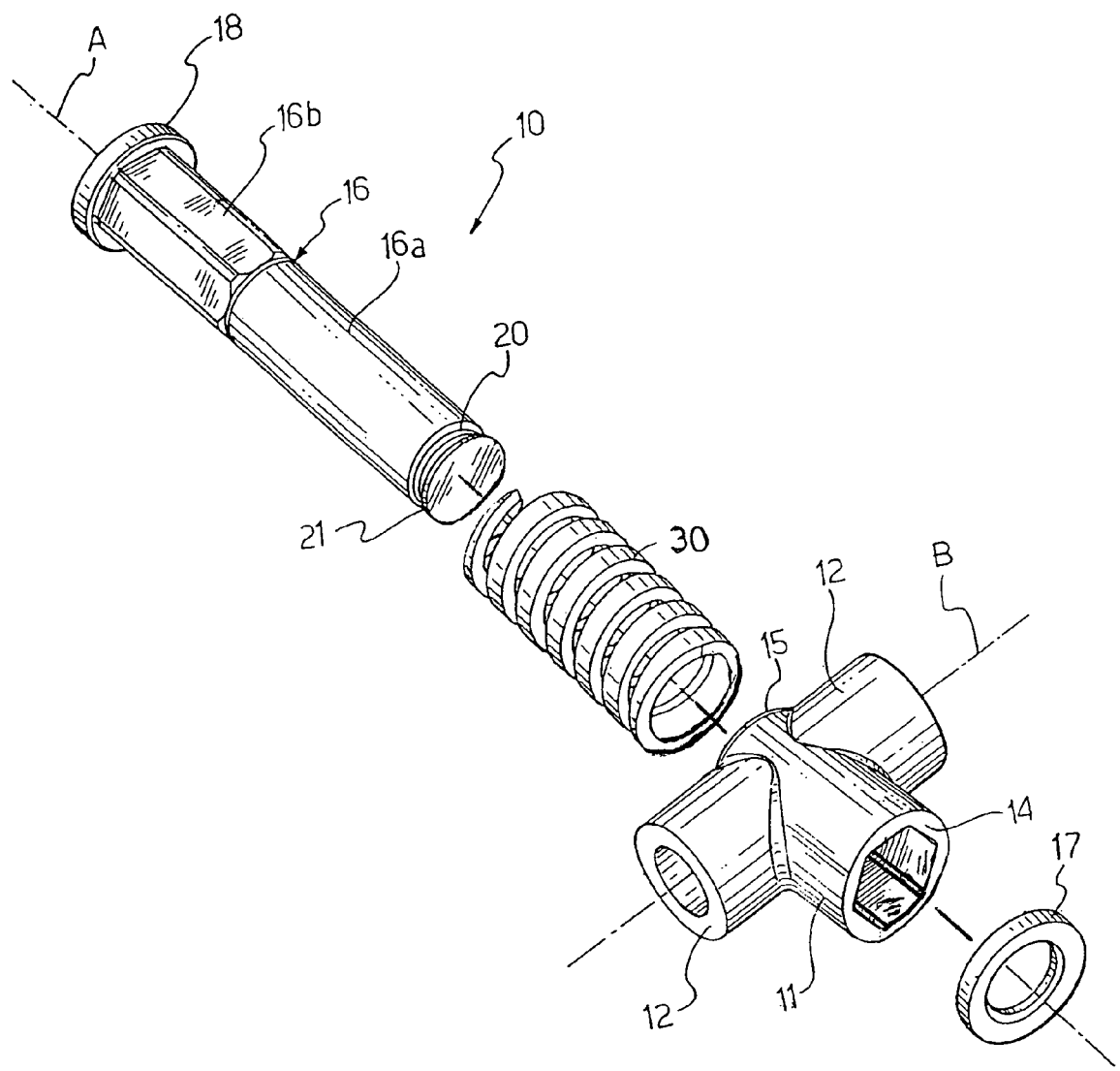
FIG. 9 is an exploded perspective view of an alternate embodiment of the nut of FIG. 7.

In a different embodiment as shown in FIG. 9, the spring 30 could be arranged between the second abutment collar 18 and the second abutment surface 15. In such a case, a knock in the direction U1' against the device 100 does not cause damage or at least minimizes damage. This means that the elastic yield of the nut 10 must allow a shortening of the diagonal between the pin elements 106 and 107 through the compression of the spring. When the knock finishes, the spring stretches out and takes the diagonal, and therefore the gearshift, back into the correct position. Such a characteristic of elastic yield of the nut 10 is advantageously also exploited in the upwards gear-shifting step in which, as stated, there is a lengthening of the diagonal. During the passage of the chain from a sprocket with a smaller diameter to a sprocket with a larger diameter, the mechanism may remain temporarily locked by the interference which is created between chain and sprocket whilst the drive member still moves the sleeve 16 up to the final position. During such a transitory step the spring is compressed allowing the relative movement between sleeve 16 and tubular body 11. When the chain disengages, the elastic force of the spring urges the tubular body 11 into the desired final position allowing the gear-shifting to be carried out correctly.

Figure 10:
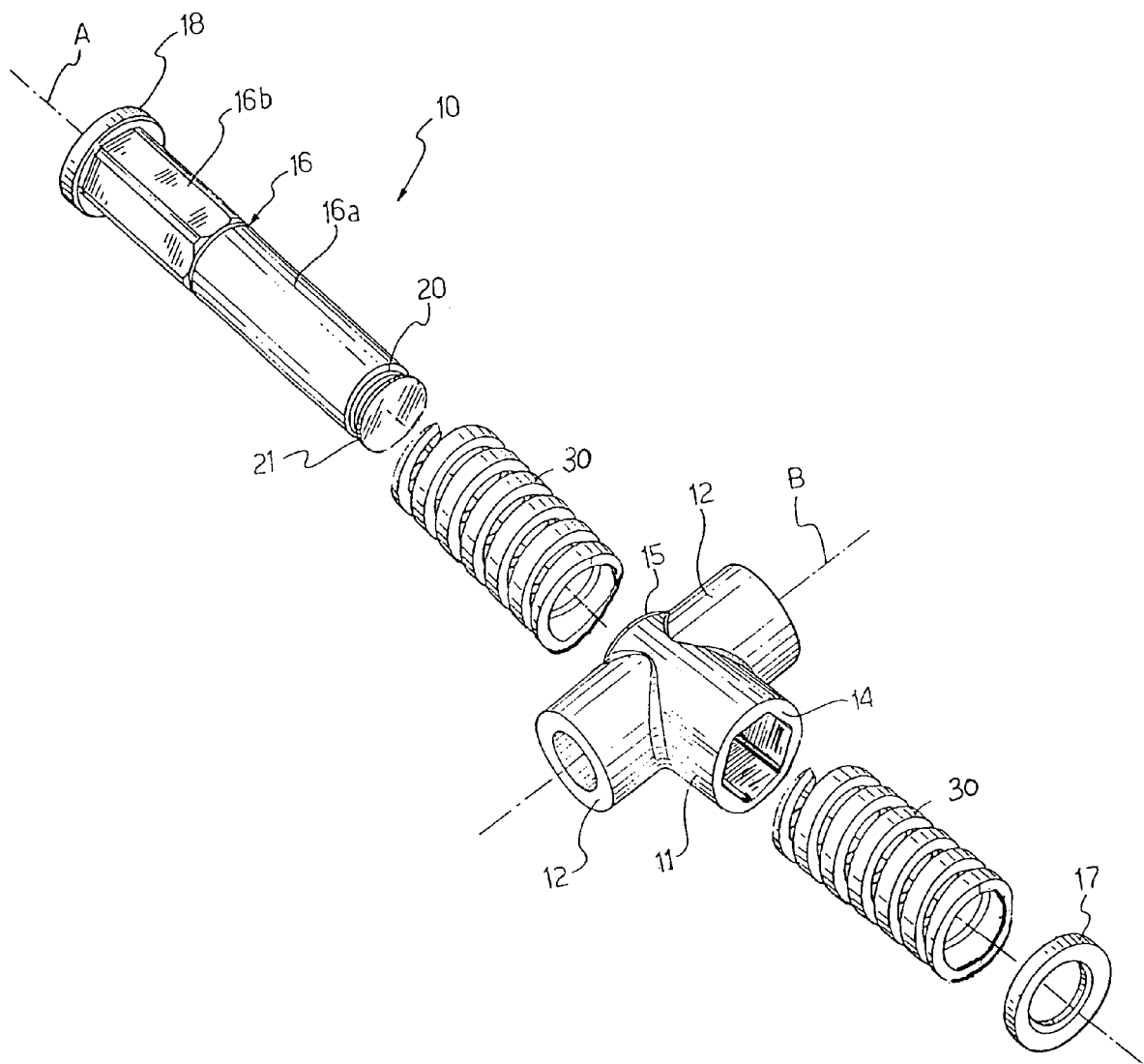
FIG. 10 is an exploded perspective view of a further alternate embodiment of the nut of FIG. 7.

Furthermore, As shown in FIG. 10, two springs 30 could be provided, between both the first abutment surface 14 and the first collar 17, and between the second abutment surface 15 and the second collar 18. Therefore, the nut would be able to absorb knocks from both directions U1 and U1'.

The sizing and the initial compression (preload) of the spring 30 are carried out so as to determine a predetermined stress threshold. When subjected to a stress below the stress threshold, the spring 30 does not deform and the nut 10 behaves like a rigid body, whereas when subjected to a stress above the stress threshold, the spring 30 yields and therefore the nut 10 deforms. The stress threshold value is thus chosen so as to be certainly above the component along the axis A of the maximum stress occurring in the mechanism 101 during normal operation, but also certainly below the component along the axis A of the minimum stress from a knock capable of damaging a member of the mechanism 101.

The behavior of nut 10 as a rigid body ensures the ready response of the mechanism following the actuation of the drive member. Should one wish to expand the field of operation in which the system readily responds, a high stress threshold is chosen. On the other hand, should one wish to allow the device to absorb even small knocks, the stress threshold is chosen with a lower value, although reducing the field in which the system readily responds.

Of course, the structural strength of each member of the mechanism 101 must be sufficiently high as to allow it to possibly to determine a stress threshold in the aforementioned way; for such a purpose, it is advantageous that the axis A according to which the elastic yield of the spring 30 occurs be the same one according to which the deformation force (when actuated) or resistance force (when still) of the drive member 120 is applied.

It should be noted that the effect of the knock on the actuator device 100 remains limited to the deformation of the spring 30, so that all of the other members of the device itself and more generally of the gearshift remain protected. This is true provided that the spring 30 is not so compressed by the knock as to go to the end stop; in such a case, indeed, every further stress component would be applied onto the other members of the device.

To avoid this risk, in a variant a mechanical fuse function can be provided, for example by adopting a collar 17 having a predetermined mechanical resistance, such as to yield (causing the disassembly of the nut 10) if stressed beyond a certain threshold Alternatively, the same function can be obtained on the abutment collar 18 or on the Seger ring (in a variant which provides it), sizing them suitably, or else on the throat 20, suitably sizing the shoulder 21 which separates it from the end of the sleeve 16. In any case, for an optimal combination of the two protections, the resistance threshold of the fuse must be such that the yielding of the fuse occurs just before the spring 30 has reached the end stop.

It should be noted that the intervention of the spring 30 in the case of a knock is perfectly and automatically reversible, in the sense that once the knock has ended, the spring 30 goes back into its starting position, as shown in FIG. 7.

Figure 3:
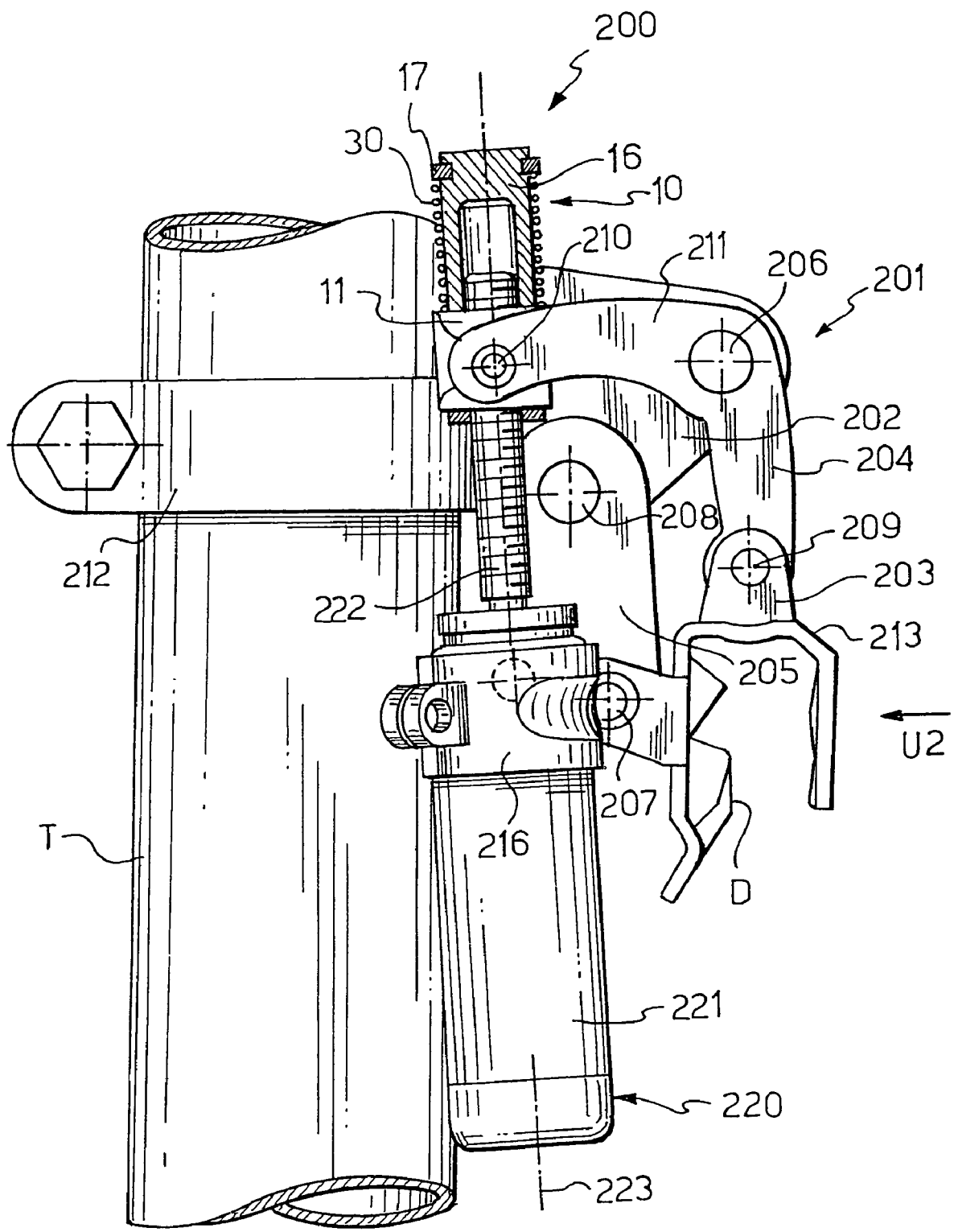
FIG. 3 is a partially sectioned view of a second embodiment of the invention.

A second embodiment of the invention is exemplified in FIG. 3, wherein an actuator device for a bicycle gearshift, particularly a front gearshift, is indicated by 200.

The device 200 comprises an actuation mechanism 201 in the shape of an articulated quadrilateral, more precisely an articulated parallelogram, intended to be driven by a drive member 220 and in turn to drive a normal derailleur D of a front gearshift of a bicycle.

The mechanism 201 comprises four connecting rods articulated together by four pin elements. The connecting rods comprise a first connecting rod 202 integral with a support 212 for fastening onto a bicycle frame, a second connecting rod 203 opposite the first connecting rod 202 and integral with a support 213 for the attachment of the derailleur, a third connecting rod 204 and a fourth connecting rod 205. The pin elements comprise a first pin element 206 (between the first and third connecting rod 202 and 204), a second pin element 207 opposite the first one (between the second and fourth connecting rod 203 and 205), a third pin element 208 (between the first and fourth connecting rod 202 and 205) and a fourth pin element 209 opposite the third one (between the second and third connecting rod 203 and 204).

A support 216 for the drive member 220 is directly associated with the frame T of the bicycle. The drive member 220 comprises an electric motor 221 (supplied with power and controlled by means of cables and control members which are not shown in the figures) equipped with a threaded drive shaft 222, extending along a driving axle 223 and rotated by the motor 221.

Drive member 220 is coupled with mechanism 201 by means of nut 10, in screwing engagement with threaded drive shaft 222 and associated with a fifth pin element 210, mounted on arm 211 integral with the third connecting rod 204. Through nut 10 and support 216, drive member 220 is able to move mechanism 201, angularly moving arm 211 so as to take nut 10 closer or farther away with respect to motor 221, or else to move the third connecting rod 204 inwards or outwards. In particular, given that device 200 is used in a front bicycle gearshift, a movement of nut 10 towards motor 221 shall be used to perform an upwards gear-shifting (i.e., towards an outer chain ring, having a larger diameter), whereas, conversely, a movement of the nut away from motor 221 shall be used for downwards gear-shifting (i.e., towards an inner chain ring, having a smaller diameter).

Nut 10 in device 200 is the same as nut 10 used in device 100 and, therefore, shall not be described any further. The considerations expressed regarding the sizing and the assembly of such a nut 10 remain equally valid.

In device 200, it is necessary to avoid a knock in direction U2 against device 200 itself that can cause damage. This means that the elastic yield of nut 10 must allow a displacement inside derailleur D and therefore must allow nut 10 to move away from motor 221, with motor 221 stopped. Consequently, the nut 10 is mounted by inserting threaded drive shaft 222 into sleeve 16 from the side of the second abutment collar 18: a knock will thus tend to compress spring 30, making sleeve 16 slide in the tubular body 11.

A third embodiment of the invention is exemplified in FIGS. 4, 5 and 6, where an actuator device for a bicycle gearshift, particularly a front gearshift, is indicated by 300.

Device 300 comprises an actuation mechanism 301 in the shape of an articulated quadrilateral, more precisely an articulated parallelogram, analogous to mechanism 201 of device 200 and shown only in part in the figures. It must be understood that what is not shown in device 301 is the same as in device 201.

The difference between the two devices is in the connection between the drive shaft and the third connecting rod. Instead of a system with a nut and arm integral with a connecting rod, in device 301 a sector gear 310 is provided integral with a lever 311. The sector gear 310 is engaged with drive shaft 322. Lever 311 is hinged to pin element 306 common to first and third connecting rods 302 and 304, and comprises first and second abutment surfaces 330 and 331, oriented radially in opposite directions about the axis of the pin element 306. Correspondingly, the third connecting rod 304 comprises first and second abutment surfaces 332 and 333, oriented radially in opposite directions about the axis of pin element 306; the first abutment surface 330 of lever 311 faces the first abutment surface 332 of the third connecting rod 304, whereas the second abutment surface 331 of lever 311 faces the second abutment surface 333 of the third connecting rod 304.

A spring 40 is placed in compressed state between the second abutment surfaces 331 and 333 of lever 311 and of the third connecting rod 304, so as to angularly force lever 311 and the third connecting rod 304 with the respective first abutment surfaces 330 and 332 against each other.

The spring 40 shown as an example is a metal helical spring; alternatively an elastomeric spring or any other spring able to apply the same action between lever 311 and the third connecting rod 304 could be used. For example, spring 40 (with the second abutment surfaces 330 and 332 between which it is compressed) could be replaced with a torsion spring (not shown), mounted so as to force, in the same way, lever 311 and the third connecting rod 304 with the respective first abutment surfaces 330 and 332 against each other.

Operatively, during gear-shifting in normal conditions, lever 311 and the third connecting rod 304 move integrally substantially realizing a single body.

In the case of knocks in the direction U3 on the derailleur D or on the third connecting rod 304, the spring 40 compresses absorbing the force of the knock applied on the quadrilateral, allowing it to deform with the moving apart of the first abutment surface 330 of the third connecting rod 304 getting farther away from the first abutment surface 332 of lever 311. When the force of the knock ends, spring 40 returns to starting conditions, taking the third connecting rod 304 with its first abutment surface 330 back against the first abutment surface 332 of the lever 311.

What is claimed is:

1. An actuator device for a bicycle gearshift, comprising an actuation mechanism that is driven by a drive member that in turn drives a derailleur of a gearshift, wherein said mechanism comprises at least one member which is capable of elastically yielding when subjected to a stress above a predetermined stress threshold, wherein the drive member comprises a motor and a threaded drive shaft rotated by the motor, wherein the mechanism comprises:
    an articulated quadrilateral with at least four connecting rods hinged together about at least four pin axes by at least four pin elements, wherein a first connecting rod is fixed to a bicycle frame, and a second connecting rod is opposite the first connecting rod in the articulated quadrilateral and is fixed to a support for the derailleur;
    a support for the motor associated with a first of the pin elements; and
    a nut associated with a second of the pin elements, opposite the first, the nut engaged with the drive shaft so that the action of the motor moves two opposite first and second pin elements closer and farther away, deforming the articulated quadrilateral, said nut comprising an internally threaded tubular sleeve engaged with the drive shaft, and the member which is capable of elastically yielding, wherein the elastically yielding member is positioned about the tubular sleeve and permits pivotal movement of the connecting rods with respect to each other without regard to whether the motor is rotating the drive shaft, the nut further comprising:
    an internally hollow tubular body surrounding a portion of the internally threaded tubular sleeve that slides axially in the tubular body;
    two abutment surfaces in the axial direction formed at opposite ends of the tubular body;
    two opposite pin portions integral and perpendicular to the tubular body;
    two protruding abutment collars provided on the tubular sleeve at opposite ends; and
    the elastically yielding member is a spring inserted on the tubular sleeve, compressed between a first of the abutment collars of the tubular sleeve and a first of the abutment surfaces of the tubular body, and a second of the abutment collars of the tubular sleeve facing a second of the abutment surfaces of the tubular body due to the elastic thrust of the spring.

2. The device of claim 1, wherein said one member which is capable of elastically yielding is subjected to a stress below said predetermined stress threshold during normal use of the gearshift when said mechanism is driven by the drive member to drive the derailleur, said member which is capable of elastically yielding being substantially rigid when subjected to a stress below said predetermined stress threshold.

3. The device of claim 1, wherein said one member which is capable of elastically yielding comprises a preloaded spring.

4. The device of claim 1, further comprising a mechanical fuse that has a predetermined mechanical resistance, and yields if stressed beyond a certain threshold.

5. The device of claim 1, wherein the drive member comprises a motor and a threaded drive shaft rotated by the motor, wherein the mechanism comprises:
    an articulated quadrilateral with at least four connecting rods hinged together about at least four pin axes by at least four pin elements, wherein a first connecting rod integrally fixed to a frame of the bicycle, and a second connecting rod is opposite the first connecting rod in the articulated quadrilateral and is fixed to a support for the derailleur;
    an arm integral with a third connecting rod of the articulated quadrilateral; and
    a nut associated with a fifth pin element mounted on the arm, the nut engaged with the drive shaft so that the action of the motor moves the arm, deforming the articulated quadrilateral, said nut comprising the member which is capable of elastically yielding.

6. The device of claim 1, wherein the drive shaft is inserted in the tubular sleeve from the side of the second abutment collar.

7. The device of claim 1, wherein the device comprises a second spring inserted on the threaded tubular sleeve, arranged between the second abutment collar of the threaded tubular sleeve and the second of the abutment surfaces of the tubular body, the first and second spring constituting respective members which are capable of elastically yielding.

8. A nut for an actuator device for a bicycle gearshift having a plurality of connecting rods hinged together about pin axes by pin elements, and an actuation mechanism that is driven by a drive member that in turn drives a derailleur of the gearshift, the nut comprising:
    an internally threaded tubular sleeve engaged with the drive member;
    a member which is capable of elastically yielding when subjected to a stress above a predetermined stress, the elastically yielding member being arranged about the tubular sleeve and positioned to permit rotational movement of said connecting rods relative to each other about said pin axes both when the drive member is driving the actuation mechanism and when the drive member is not driving the actuation mechanism;
    an internally hollow tubular body that surrounds a portion of the internally threaded tubular sleeve, which slides axially in the tubular body;
    two abutment surfaces in the axial direction formed at opposite ends of the tubular body:
    two opposite pin portions, integral and perpendicular to the tubular body;
    two protruding abutment collars provided on the threaded tubular sleeve at opposite ends thereof; and
    the elastically yielding member being a spring compressed between a first of the abutment collars of the threaded tubular sleeve and a first of the abutment surfaces of the tubular body, with the second of the abutment collars of the tubular sleeve facing the second of the abutment surfaces of the tubular body due to the elastic thrust of the spring.

9. The nut of claim 8, wherein the spring is a metal helical spring.

10. The nut of claim 8, wherein the spring is a tubular elastomeric spring.

11. An actuator device for a bicycle gearshift, comprising:
a derailleur:
an actuator for moving the derailleur, the actuator comprising a plurality of connecting rods hinged together about pin axes by pin elements:
a driver for moving the actuator, the driver having a threaded drive shaft, a motor that rotates the threaded drive shaft, and a shock absorber which elastically yields when subjected to a stress greater than a predetermined threshold; the shock absorber comprising an internally threaded tubular sleeve engaged with the threaded drive shaft, and a spring arranged about the tubular sleeve; whereby the shock absorber protects the actuator device against knocks when exposed to a stress greater than a predetermined threshold by permitting rotational movement of the connecting rods relative to each other about said pin axes both when the driver is moving the actuator and when the drive member is not moving the actuator;
an articulated Quadrilateral having at least four connecting rods hinged together by at least four pin elements and wherein a first connecting rod is fixed to a bicycle frame, and a second connecting rod is fixed to a support for the derailleur;
a support for the motor associated with a first pin element;
the shock absorber being associated with a second pin element opposite the first pin element, the shock absorber being engaged with the drive shaft so that motor action moves the two opposite first and second pin elements closer and farther away by deforming the articulated quadrilateral; and wherein the shock absorber further comprises:
a hollow tubular body that surrounds a portion of the internally threaded tubular sleeve, which slides axially in the tubular body;
first and second axial abutment surfaces at opposite ends of the tubular body;
first and second pin portions integral with and perpendicular to the tubular body; and
first and second abutment collars provided at opposite ends of the tubular sleeve; and wherein the spring inserted on the tubular sleeve is compressed between the first abutment collar and the first abutment surface, the second abutment collar facing the second abutment surface as a result of forces exerted by the spring.

12. The device of claim 11, wherein the shock absorber remains substantially rigid when subjected to a stress less than a predetermined threshold.

13. The device of claim 11, wherein the shock absorber comprises a preloaded spring.

14. A shock absorber for an actuator of a motor-driven derailleur, the shock absorber comprising:
a tubular body having a central axis, that is coplanar with a central axis of a drive shaft of a motor;
an internally threaded tubular sleeve that fits within the tubular body and mates with the drive shaft, having spaced apart external retaining means; and
an elastic biasing member which is arranged about the tubular sleeve and located between the retaining means about the central axis of the drive shaft and has a predetermined load resistance;
wherein the actuator comprises a plurality of connecting rods hinged together about pin axes, and said elastic biasing member permits rotational movement of the connecting rods about the pin axes when a load greater than that of the predetermined load resistance is applied both when the motor is rotating the drive shaft and when the motor is not rotating the drive shaft.

15. The shock absorber of claim 14, wherein the derailleur comprises an articulated quadrilateral having at least four connecting rods hinged together about at least four pin axes by at least four pin elements, wherein a first connecting rod is fixed to a bicycle frame, and a second connecting rod is opposite the first connecting rod in the articulated quadrilateral and is fixed to a support for the derailleur.

16. The shock absorber of claim 15, further comprising a nut associated with a second of the pin elements, opposite the first, the nut engaged with the drive shaft so that the action of the motor moves two opposite first and second pin elements closer and farther away, deforming the articulated quadrilateral, said nut comprising the biasing member.

17. The shock absorber of claim 14, wherein the biasing member yields when the derailleur is subjected to a stress above the pre-determined load resistance.

* * * * *

UNITED STATES PATENT AND TRADEMARK OFFICE
CERTIFICATE OF CORRECTION

PATENT NO.         : 8,033,937 B2
APPLICATION NO.    : 10/911195
DATED              : October 11, 2011
INVENTOR(S)        : Mario Meggiolan Page 1 of 1

It is certified that error appears in the above-identified patent and that said Letters Patent is hereby corrected as shown below:

On the title page, at section (56), column 2, under "FOREIGN PATENT DOCUMENTS," after the first line "DE 035 02 774 A1 10/1986", delete the second line "DE 3502774 A1 10/1986".

At column 2, line 19, after the words "the nut of", delete "FIG. 7." and insert therefor --FIG. 7;--.

At column 2, line 21, after the words "the nut of", delete "FIG. 7." and insert therefor --FIG. 7; and--.

At column 4, line 45, after the word "Furthermore,", delete "As" and insert therefor --as--.

In claim 8, at column 8, line 51, after the word "tubular", delete "body:" and insert therefor --body;--.

In claim 11, at column 9, line 2, after the word "a", delete "derailleur:" and insert therefor --derailleur;--.

In claim 11, at column 9, line 5, after the word "pin", delete "elements:" and insert therefor --elements;--.

Signed and Sealed this
Seventh Day of February, 2012

David J. Kappos
*Director of the United States Patent and Trademark Office*